Patented May 16, 1933

1,909,455

UNITED STATES PATENT OFFICE

WARREN F. BUSSE, OF AKRON, OHIO, ASSIGNOR TO THE B. F. GOODRICH COMPANY, OF NEW YORK, N. Y., A CORPORATION OF NEW YORK

FIBROUS RUBBER PRODUCT AND PROCESS OF PRODUCING THE SAME

No Drawing.     Application filed June 15, 1932. Serial No. 617,480.

This invention relates to the preparation of a novel material from rubber, and has as its principal object the preparation of a fibrous product of extremely high tensile strength and an extraordinary degree of resistance to corrosive chemicals.

Certain types of rubber goods have heretofore been vulcanized by treating the rubber with sulphur chloride, either in the liquid state or as a vapor. If the treatment is continued for only a very short time, the product is vulcanized to a resilient, highly extensible condition, such as is characteristic of many common rubber products, including ordinary rubber balloons, for example. If the treatment is continued for a longer period of time, the rubber loses its strength and becomes hard and brittle and of no value for any purpose.

This invention consists in a novel process whereby rubber is converted to a form which is not highly extensible, like the familiar soft vulcanized rubber, but is tough and fibrous and extremely resistant to extension and to rupture. This process includes stretching rubber to several times its original dimensions and subjecting the stretched rubber to the action of an appropriate vulcanizing agent, such as sulphur chloride vapor. The rubber, upon being stretched, acquires a fibrous anisotropic structure, as is readily demonstrated by observation of its X-ray diffraction diagram. The structure of the stretched rubber may be temporarily fixed by cooling (producing the so-called "racked" rubber), but upon being warmed it retracts to approximately its original shape, losing its fibrous structure. The treatment of the rubber with a vulcanizing agent, however, fixes its fibrous structure permanently, so that it does not retract more than a small percentage of its stretched length, even when heated up to or above the temperature of boiling water.

In one embodiment of the invention, a sheet of unmasticated rubber 0.005 inch thick is prepared by drying a film of rubber latex on a suitable supporting surface. The rubber sheet is stretched to an elongation just short of that required to rupture it, say to about ten times its original length, and is placed in a chamber containing air saturated with the vapors of sulphur chloride for a period of about fifteen minutes. After standing in the ordinary atmosphere for several hours to permit the absorbed sulphur chloride to react completely, the product is examined, and is found to retain its stretched length substantially unchanged, and to exhibit a pronounced fibrous structure in the direction of its original elongation. It is easily split into strips in the direction parallel to the original elongation, and may even be shredded into individual fibers, but exhibits a remarkably high resistance to further elongation and to rupture. It is extremely flexible and may bend sharply without breaking. The product exhibits a pronounced X-ray fiber diagram similar to that of the common natural fibers.

The strength of the fibrous vulcanized rubber of this invention depends on the extent to which the rubber was stretched before vulcanization. It is therefore preferred to release the tension on the rubber after it is first stretched, permitting it to return to as near its original dimensions as may be, and then stretch it again or even a third or fourth time. The elongation which is attained is thereby considerably increased and the strength of the product correspondingly enhanced. The elongation may also be somewhat increased by stretching the rubber at a relatively high temperature and immediately cooling the rubber so that it will maintain its elongation before and during the vulcanization.

If desired, the rubber may even be stretched simultaneously in two directions at right angles to each other. The product, after vulcanization, then exhibits the unusual strength characteristic of the products of this invention, but instead of being fibrous in nature, is equally strong in all directions in the plane in which it was stretched.

The vulcanization may be carried out at any temperature over a wide range, temperatures varying from 0° to 85° C. having been employed, although either lower or higher temperatures may be used, particularly when vulcanized rubber is employed as is described below. The lower temperatures are generally preferred because of an increased stability of the sulphur chloride and because the plastic flow of the rubber at low temperatures is less and the true elongation attainable is consequently somewhat greater. The time of vulcanization should be sufficient to develop the full strength of the product, generally from five to fifteen or twenty minutes, but a prolonged exposure does no appreciable harm, since the rubber is apparently fully saturated with the vulcanizing agent in a short time, and not subject to a further change. The characteristic final properties of the product are not immediately developed, but apparently require a considerable period after exposure to the sulphur chloride. The moisture of the atmosphere seems to have some influence on the reaction, since the retraction of the vulcanized product on heating is greater if it is maintained in perfectly dry air. If desired, the vulcanized product may even be dipped in dilute ammonia solution, the water of which apparently assists in developing the properties characteristic of the product, while the ammonia serves to neutralize the acid which may be formed by decomposition of the sulphur chloride.

Calendered sheets of masticated rubber cannot be treated in the same manner as the unmasticated latex rubber described above, for the mastication destroys the resiliency of the rubber and makes it plastic, so that no considerable true "reversible" elongation is attainable. However, the masticated rubber may be used if its extensibility is restored by vulcanization. Certain ingredients, particularly basic substances, retard the action of sulphur chloride, hence the time required for the treatment of stretched soft vulcanized rubber must be separately determined for each different vulcanized composition. The preliminary vulcanization may be carried out by any convenient means, by sulphur, either with or without accelerators, or by sulphur chloride itself, but should be so regulated as to permit a high degree of extension before the final treatment with sulphur chloride.

The rubber which is treated in accordance with this invention should be in sheets or strips sufficiently thin that the sulphur chloride may penetrate their entire thickness and effect a uniform vulcanization. If the thickness greatly exceeds 0.01 inches the vulcanization tends to be superficial with the center of the rubber still substantially unaffected.

The extraordinary results attainable by means of this invention may be illustrated by the following example, in which portions of a sheet of unmasticated latex rubber are stretched varying amounts and all treated fifteen minutes in sulphur chloride vapor at 0° C. The ultimate tensile strengths and elongations are shown in the following table.

| Initial stretch | Ultimate tensile strength | Ultimate elongation |
| --- | --- | --- |
| Percent | Pounds per square inch | Percent |
| 0 | 218 | 15 |
| 300 | 4,560 | 20 |
| 600 | 7,070 | 20 |
| 900 | 10,450 | 30 |
| 1,200 | 17,100 | 25 |

The products of this invention may be used for any purpose for which flexible, fibrous substances have heretofore been used. The fibrous product may be split into flat strips which can be woven into a fabric, or the strips may be helically rolled to produce round threads which may be woven, or built up into cords, or the product may even be shredded into individual fibers which may then be spun into threads, or matted into felts, or otherwise employed.

The fibrous products of this invention are extremely resistant to corrosive chemicals, including all the common alkalies and acids with the exception of strong oxidizing acids, and are therefore particularly adapted to uses for which the ordinary textile fibers are unsuited because of their chemical reactivity. They do not deteriorate unduly with age, as does soft rubber vulcanized with sulphur chloride. However, their resistance to deterioration may be still further increased by treating them with anti-oxidants and anti-acids such as nitrogenous bases, including for example, ammonia, triethanolamine, metaphenylene diamine, etc.

The sulphur chloride which is preferably employed in the practice of this invention is the ordinary sulphur monochloride such as is used as a vulcanizing agent in the rubber industry. It is preferably employed in the vapor form rather than as a solution in an organic solvent, because of the detrimental effect of such solvents on highly stretched rubber. However, the invention is not necessarily limited to this one vulcanizing agent, but other substances capable of a true vulcanization of rubber to a comparatively inextensible product, such as hydrogen persulphide or phosphorus sulphide, or even elemental sulphur when used with appropriate accelerators, may be substituted therefor. Substances which do not exert a true vulcanizing action, such as the halogens, do not give rise to the products herein described.

Although a preferred method of carrying out this invention has been described in considerable detail, it is to be understood that the invention is not limited thereto, for the process described is susceptible of numerous modifications and variations in its several parts, without exceeding the scope of this invention or of the appended claims.

I claim:

1. The process which comprises stretching rubber, and vulcanizing the stretched rubber to a point at which it permanently retains the major part of its elongation together with the anisotropic structure imparted to it by the stretching.

2. The process which comprises stretching rubber to several times its original length, and vulcanizing the stretched rubber with a vulcanizing agent selected from the group consisting of compounds of sulphur with hydrogen, phosphorus, and chlorine.

3. The process which comprises stretching rubber to several times its original dimensions and vulcanizing it with sulphur chloride.

4. The process which comprises stretching rubber to an elongation just short of that at which it ruptures, and vulcanizing the stretched rubber in sulphur chloride vapor.

5. The process which comprises stretching unmasticated thin sheet rubber to an elongation just short of that at which it ruptures, and vulcanizing the stretched rubber in sulphur chloride vapor.

6. The process which comprises stretching rubber a plurality of times to impart to it the maximum practicable elongation, and vulcanizing the stretched rubber with a cold vulcanizing agent to a point at which it permanently retains the major part of its elongation together with the anisotropic structure imparted to it by the stretching.

7. The process which comprises stretching rubber a plurality of times in a single direction to impart to it the maximum practicable elongation, and vulcanizing the stretched rubber with a cold vulcanizing agent to a point at which it permanently retains the major part of its elongation together with the fibrous structure imparted to it by the stretching.

8. The process which comprises stretching rubber a plurality of times to impart to it the maximum practicable elongation, and vulcanizing the stretched rubber in sulphur chloride vapor.

9. The process which comprises stretching rubber to several times its original length, vulcanizing the stretched rubber in sulphur chloride vapor, and subjecting the vulcanized stretched rubber to the action of moisture.

10. The process which comprises stretching rubber at least twice to impart to it the maximum practicable elongation, vulcanizing the stretched rubber in sulphur chloride vapor, and subjecting the vulcanized stretched rubber to the action of moisture.

11. The process which comprises stretching rubber to several times its original dimensions, vulcanizing the stretched rubber in sulphur chloride vapor, and immersing the vulcanized stretched rubber in aqueous ammonia solution.

12. The process which comprises stretching rubber to several times its original dimensions, vulcanizing the stretched rubber in sulphur chloride vapor, and treating the vulcanized stretched rubber with a nitrogenous base.

13. The process which comprises stretching rubber a plurality of times to impart to it the maximum practicable elongation, vulcanizing the stretched rubber in sulphur chloride vapor, and immersing the vulcanized stretched rubber in aqueous ammonia solution.

14. The process which comprises stretching rubber simultaneously in two directions perpendicular one to another, and vulcanizing the stretched rubber in sulphur chloride vapor.

15. An anisotropic vulcanized rubber characterized by high tensile strength and low ultimate elongation and retaining its anisotropic properties when heated to the temperature of boiling water.

16. A fibrous vulcanized rubber characterized by a high tensile strength and low ultimate elongation and retaining its fibrous structure after heating to the temperature of boiling water.

17. A fibrous vulcanized rubber characterized by a high tensile strength and low ultimate elongation and exhibiting a characteristic X-ray fiber diagram which is not destroyed by heating to the temperature of boiling water.

18. A fibrous vulcanized rubber vulcanized by sulphur chloride and characterized by a high tensile strength and low ultimate elongation and retaining its fibrous structure after heating to the temperature of boiling water.

19. A fibrous vulcanized rubber vulcanized by sulphur chloride and characterized by a high tensile strength and low ultimate elongation and exhibiting a characteristic X-ray fiber diagram which is not destroyed by heating to the temperature of boiling water.

20. A sheet rubber characterized by high tensile strength and low elongation in its own plane, prepared by stretching thin sheet rubber in two directions perpendicular one to another and vulcanizing the stretched rubber in sulphur chloride vapor.

21. The process which comprises stretching rubber simultaneously in two directions and vulcanizing the stretched rubber to a point at which it permanently retains the major part of its elongation together with the anisotropic structure imparted to it by the stretching.

22. An anistropic sheet rubber characterized by high tensile strength and low elongation in its own plane and retaining its anisotropic properties when heated to the temperature of boiling water, prepared by stretching sheet rubber in two directions and vulcanizing the stretched rubber.

In witness whereof I have hereunto set my hand this 13th day of June 1932.

WARREN F. BUSSE.